United States Patent Office 3,711,525
Patented Jan. 16, 1973

3,711,525
STABILIZED IRON CHELATES AND PLANT TREATING AGENTS CONTAINING THE SAME
Claude Hennart, 86 Rue Sadi Carnot, F–93 Aubervilliers, France
No Drawing. Filed Nov. 25, 1970, Ser. No. 92,885
Int. Cl. C07f 15/02
U.S. Cl. 260—439 R  9 Claims

ABSTRACT OF THE DISCLOSURE

Solid or liquid compositions containing an iron chelate of the ethylenediamino-tetraacetic acid complex type and a 2-hydroxy-benzophenone as stabilizer. These compositions are employed for the treatment of plants.

DESCRIPTION OF THE INVENTION

The present invention concerns compositions based on ferric complexes (iron chelates), stabilized by the addition of compounds belonging to the chemical class of the hydroxy-benzophenones.

Iron plays a very important role in the physiology of plants; in fact, this element plays the role of catalyst for the transformation of leucophyll into chlorophyll; a deficiency of iron by plants leads to a decrease in the amount of chlorophyll and is manifested in a gradual disappearance of the green coloring of the plants. This disease which is called iron deficiency chlorosis, when it is very pronounced, causes the leaves to fall off and then arrests the growth of the affected plant.

The means for coping with this problem are thus very important in the cultivation of plants. These consist of supplying iron which can be assimilated by the roots or leaves. Scattering or spraying the customary iron salts such as the sulphate, have a weak and short-lived effect; in addition, these salts sometimes cause lesions; the best effects are obtained by using organic iron complexes such as the chelates in which the iron is strongly bound and which may be absorbed by the plants without involving the above-mentioned difficulties.

The most effective complexes presently known are those described in French Pat. No. 1,161,196, filed Oct. 10, 1956; these are derivatives of ethylenediamino-bis-(hydroxy-phenyl-acetic acid). Of these, the best known are the ferric chelates of ethylenediamino-N,N'-bis[α-(2-hydroxy-phenyl)-acetic acid] and ethylenediamino-N,N-bis-[α-(2-hydroxy-5-methylphenyl)-acetic acid] in the form of their sodium salts.

These complexes are designated respectively in the present description by the abbreviations EDDHA/Fe and EDDHMA/Fe. They are chemically very stable but unstable to certain factors such as the action of light which decomposes them and gradually makes them inactive. This drawback is particularly noticeable when these compounds are in solution which makes it difficult or even impossible to employ them in this form. Various well-known stabilizers have been tested to protect the above-mentioned chelates, but without any success. The mixtures of the chelates with the stabilizers decomposed rapidly in aqueous solution, even when using the stabilizer in amounts of 25 to 50% by weight of the chelate.

The applicant, however, has found that a certain class of hydroxy-benzophenones, used in customary concentrations, have a surprisingly stabilizing effect against deterioration due to the influence of light, climate, etc., when they are added to certain iron chelates.

Thus the present invention comprises, in particular, the application of hydroxy-benzophenones corresponding to the formula

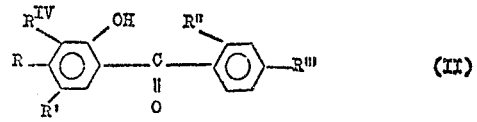

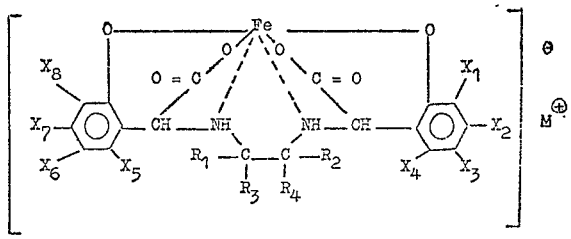

for the stabilization of ferric complexes defined by the following formula

They may be applied in the form of solid or liquid compositions containing one or more of the ferric complexes I in an amount of about 0.01 to 80% by weight for the former, and from about 0.01 to 20% by weight for the latter, in addition to one of the hydroxy-benzophenones II in an amount of from 0.02 to 10%, preferably from 0.2 to 2% by weight, calculated on the complex or complexes I, the solid compositions being at least partially soluble in water, while the liquid compositions are at least partially aqueous.

In Formula I, $R_1$, $R_2$, $R_3$ and $R_4$ are identical or different and are selected from a hydrogen atom, an alkyl radical having 1 to 5 carbon atoms, or a hydroxyalkyl radical having 1 to 3 carbon atoms, $R_3$ and $R_4$ in addition can be selected from an alkylene group having 3 to 6 carbon atoms, in particular the tetramethylene group; $X_1$ to $X_8$ are identical or different and are selected from a hydrogen atom, an alkyl radical having 1 to 12 carbon atoms, an OH, $NO_2$ or CN group, an alkoxy group containing 1 to 8 carbon atoms, a chlorine, bromine, iodine atom, —COOM or —$SO_3$M and

wherein $Y_1$ is selected from the group consisting of a hydrogen atom, an alkyl radical having 1 to 4 carbon atoms, a hydroxyalkyl radical having 2 to 4 carbon atoms, an alkanoyl radical having 1 to 8 carbon atoms, an alkanoyl radical having 2 to 8 carbon atoms, while $Y_2$ is selected from the group consisting of a hydrogen atom, an alkyl radical having 1 to 4 carbon atoms and a hydroxyalkyl radical having from 2 to 4 carbon atoms; $X_1$ to $X_8$ being preferably so chosen that the two aromatic moieties of the molecule are symmetric, $X_1$ to $X_8$ preferably representing hydrogen atoms and/or methyl radicals; M and M⊕ are identical or different and are each selected from the group consisting of a hydrogen ion or an alkali-metal cation, and a cation defined by the formula

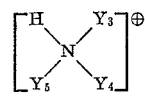

wherein $Y_3$, $Y_4$ and $Y_5$ are identical or different and are each selected from the group consisting of a hydrogen atom, an alkyl radical having 1 to 4 carbon atoms; and a hydroxyalkyl radical having from 2 to 4 carbon atoms; in addition $Y_3$ and $Y_4$ together with the nitrogen atom to which they are bound may be selected from the group consisting of a pyrrolidino, piperidino, morpholino, 1-piperazino and 4-methyl-1-piperazino radical.

In Formula II,

R is selected from the group consisting of hydrogen, hydroxy and alkyl of from 1 to 8 carbon atoms, R' is selected from the group consisting of hydrogen, chlorine, alkyl of from 1 to 5 carbon atoms, and $SO_3M$, R" is selected from the group consisting of hydrogen, chlorine, hydroxy, an alkyl radical of from 1 to 5 carbon atoms, an alkoxy of from 1 to 8 carbon atoms, and —COOM, R'" is selected from the group consisting of hydrogen, chlorine, hydroxy, an alkyl radical of from 1 to 5 carbon atoms, and an alkoxy of from 1 to 8 carbon atoms, and $R^{IV}$ is selected from the group consisting of hydrogen and an alkyl radical of from 1 to 5 carbon atoms, M having one of the meanings given in connection with Formula I.

The rest of the composition, if any, consists essentially of one or more members of the class of fertilizers, insecticides, fungicides, nematocides, bactericides, surface-active agents, compounds supplying trace elements for plants, dissolving intermediaries for aiding dissolution of the solid composition in water, and, in the case of liquid compositions, the rest may be totally or partially water.

One or more of these components may be present in the composition according to the invention in amounts appropriate for obtaining the desired effect; they must be selected in such a way that they are, on the one hand, compatible with each other and, on the other hand, compatible with the ferric complexes and the stabilizers.

Of the ferric complexes which are suitable in attaining the object of the invention, there may be mentioned, as non-limitative examples, the sodium, potassium, ammonium, diethylamine, diethanolamine and morpholine salts of ferric chelates formed with the following acids:

1,2-bis-(2-hydroxy-α-carboxybenzylamino)-ethane,[a]
1,2-bis-(2-hydroxy-α-carboxybenzylamino)-ethane,[b] ethane,[b]
1,2-bis-(2-hydroxy-3-methyl-α-carboxybenzylamino)-ethane,
1,2-bis-(2-hydroxy-4-methyl-α-carboxybenzylamino)-ethane,
1,2-bis-(2-hydroxy-3,5-dimethyl-α-carboxybenzylamino)-ethane,
1,2-bis-(2-hydroxy-5-tert-butyl-α-carboxybenzylamino)-ethane,
1,2-bis-(2-hydroxy-5-octyl-α-carboxybenzylamino)-ethane,
1,2-bis-(5-chloro-2-hydroxy-α-carboxybenzylamino)-ethane,
1,2-bis-(5-bromo-2-hydroxy-α-carboxybenzylamino)-ethane,
1,2-bis-(3,5-dichloro-2-hydroxy-α-carboxybenzylamino)-ethane,
1,2-bis-(3,5-dibromo-2-hydroxy-α-carboxybenzylamino)-ethane,
1,2-bis-(2-hydroxy-5-iodo-α-carboxybenzylamino)-ethane,
1,2-bis-(5-carboxy-2-hydroxy-α-carboxybenzylamino)-ethane,
1,2-bis-(5-cyano-2-hydroxy-α-carboxybenzylamino)-ethane,
1,2-bis-(2,4-dihydroxy-α-carboxybenzylamino)-ethane,
1,2-bis-(2-hydroxy-5-sulpho-α-carboxybenzylamino)-ethane,
1,2-bis-(2-hydroxy-5-nitro-α-carboxybenzylamino)-ethane,
1,2-bis-(2-hydroxy-4-methoxy-α-carboxybenzylamino)-ethane,
1,2-bis-(2-hydroxy-4-hexyloxy-α-carboxybenzylamino)-ethane,
1,2-bis-(2-hydroxy-α-carboxybenzylamino)-propane,
1,2-bis-(2-hydroxy-α-carboxybenzylamino)-butane,
2,3-bis-(2-hydroxy-α-carboxybenzylamino)-butane,
1,2-bis-(2-hydroxy-α-carboxybenzylamino)-cyclohexane,
1,2-bis-(2-hydroxy-α-carboxybenzylamino)-4-hydroxy-butane.

Of the stabilizers employed according to the invention, the following may be mentioned as non-limitative examples:

2-hydroxy-benzophenone,
2-hydroxy-4-methoxy-benzophenone,
2-hydroxy-4-methoxy-5-sulpho-benzophenone,
5-chloro-2-hydroxy-benzophenone,
2-hydroxy-4-methoxy-4'-methyl-benzophenone,
2-hydroxy-5-methyl-benzophenone,
2-hydroxy-4'-methyl-benzophenone,
2-hydroxy-4'-ethyl-benzophenone,
2,2'-dihydroxy-benzophenone,
2,4-dihydroxy-benzophenone,
2,2'-dihydroxy-4-methoxy-benzophenone,
2,2'-dihydroxy-4,4'-dimethoxy-benzophenone,
2,4-dihydroxy-4'-methyl-benzophenone,
2,4-dihydroxy-4'-methoxy-benzophenone,
2,4-dihydroxy-4'-ethyl-benzophenone,
2,2'-dihydroxy-4,4'-dimethoxy-5-sulpho-benzophenone (sodium salt),
2,4,4'-trihydroxy-benzophenone,
2,2',4,4'-tetrahydroxy-benzophenone,
2,4-dihydroxy-4'-octyloxy-benzophenone,
2,2'-dihydroxy-4-octyloxy-benzophenone,
2,2'-dihydroxy-3-methyl-benzophenone,
2,4-dihydroxy-2'-carboxy-benzophenone (sodium salt),
2,2'-dihydroxy-4'-chloro-benzophenone,
2,2'-dihydroxy-5-chloro-4,4'-dimethoxy-benzophenone.

The hydroxy-benzophenones contemplated are easily obtained by reacting benzoic acid or a homolog thereof with suitable phenols; Lewis acids such as aluminium chloride or boron fluoride are excellent catalysts for this type of reaction; these processes are extensively described in the literature (cf. in particular Ber. 1897, 30, 971; Org. reactions, 1949, 5, 387; Bul. Soc. Chim. 1952, p. 50; J. Org. Chem. 1954, 19, 1243).

It is remarkable to note that the here-contemplated stabilizers are completely non-toxic toward plants; this is indispensable for their intended use.

Furthermore, it was unexpected that these hydroxy-benzophenones would retain their stabilizing properties in the presence of an alcohol such as is present in the preferred compositions according to the invention, since it is known that benzophenone in the cold undergoes a photochemical reduction in the presence of alcohol, which denatures it.

Several experiments are described below to demonstrate the effectiveness of these stabilizers.

EXPERIMENT I

Varying amounts of the chelate EDDHA/Fe were dissolved in distilled water and the solutions obtained were distributed in colorless glass bottles; each bottle contained 100 g. of the solution and was hermetically sealed.

The bottles were placed in a polished aluminium cabinet with a 700 watt, high pressure mercury vapor lamp inside, which to a large degree reproduces the solar spectrum from 2800 to 7600 angstroms; the interior tempera- ---
[a] The salts of this ferric complex are known as the iron chelates of ethylenediamino-N,N'-bis[α-(2-hydroxyphenyl) acetic acid]; the sodium salt is designated in the present description by the abbreviation EDDHA/Fe.

[b] The salts of this ferric complex are known as the iron chelates of ethylenediamino-N,N'-bis[α-(2-hydroxy-5-methylphenyl)-acetic acid]; the sodium salt is designated in the present description by the abbreviation EDDHMA/Fe.

ture of the cabinet was maintained at about 50° C. during the entire duration of the test.

Periodically, a spectrophotometric quantity determination of the EDDHA/Fe chelate was made of each bottle, using a wave length in the vicinity of 490 millimicrons corresponding to the absorption maximum of the chelate EDDHA/Fe in solution.

The results obtained are given in the table below; values are expressed in chelate percent, calculated on a control sample having the same concentration, but which was not exposed to light.

| Concentration of EDDHA/Fe (percent) | Length of exposure (in hours) | | | | |
|---|---|---|---|---|---|
| | 40 | 60 | 80 | 100 | 120 |
| 5 | 88 | 80 | 76 | 73 | 70 |
| 2 | 71 | 64 | 62 | 57 | 55 |
| 0.5 | 65 | 58 | 48 | 40 | 30 |
| 0.05 | 38 | 0 | | | |

These results show that the EDDHA/Fe chelate in solution is unstable under the conditions of the experiment and, in particular, in a solution of low concentration.

EXPERIMENT II

Varying solutions of the chelate EDDHMA/Fe in distilled water were prepared and they were put under the same conditions described in Experiment I.

The spectophotometric determinations were made using a wave length in the vicinity of 505 millimicrons, corresponding to the absorption maximum of the EDDHMA/Fe chelate in solution. The results obtained are given in the following table, compared with a control sample of the same concentration which has not been exposed to light.

| Concentration of EDDHMA/Fe (percent) | Length of exposure (in hours) | | | | |
|---|---|---|---|---|---|
| | 20 | 40 | 60 | 120 | 180 |
| 0.5 | 93 | 90 | | 88 | 72 |
| 0.1 | 92 | 68 | | 41 | 30 |
| 0.05 | 86 | | 40 | 22 | 12 |
| 0.02 | 76 | | 26 | 0 | |

These results show that the EDDHMA/Fe chelate in solution is unstable under the conditions of the experiment, though to a lesser degree than the EDDHA/Fe chelate and, here also, more particularly in a solution of low concentration.

EXPERIMENT III

An aqueous/alcoholic solution (60% by volume of ethanol and 40% of water) containing 0.1% of EDDHA/Fe chelate is prepared and placed in bottles as described in Experiment I; 500 p.p.m. of one of the stabilizers according to the invention are added; these were designated as follows:

A: 2,2′,4,4′-tetrahydroxy-benzophenone,
B: 2,2′-dihydroxy-4,4′-dimethoxy-benzophenone,
C: 2-hydroxy-4-methoxy-benzophenone,
D: 2,4-dihydroxy-benzophenone,
E: sodium salt of 2,2′-dihydroxy-4,4′-dimethoxy-5-sulphobenzophenone.

Parallel to this, another series of similar bottles was prepared containing the same solution, but without stabilizer.

This control series was designated by the letter X.

The bottles thus prepared were placed in the irradiation apparatus described in connection with Experiment I and the spectrophotometric determinations were made after 120 hours of exposure under the same conditions given in that experiment.

These same tests were repeated using an amount of 250 p.p.m. of each of the stabilizers.

The results obtained are given in the table below (the values are expressed in terms of a control as in the case of Experiment I).

| Type of stabilizer | Concentration of stabilizer | |
|---|---|---|
| | 500 p.p.m. | 250 p.p.m. |
| A | 84 | 77 |
| B | 42 | 39 |
| C | 62 | 53 |
| D | 70 | 59 |
| E | 43 | 30 |
| X | 0 | 0 |

These results demonstrate that the compounds of the class of 2-hydroxy-benzophenones effectively protect the EDDHA/Fe chelate.

EXPERIMENT IV

Aqueous solutions of 0.5% and 0.05% of the EDDHA/Fe chelate were prepared and separated into several portions; 2,2′,4,4′-tetrahydroxy-benzophenone was added thereto in varying amounts and put into bottles which were placed in the irradiation apparatus described in Experiment I.

The spectrophotometric determinations were made periodically; the results obtained are given in the table below:

| Concentration of EDDHA/Fe (percent) | Length of exposure (in hours) | | | | |
|---|---|---|---|---|---|
| | 40 | 60 | 80 | 100 | 120 |
| 1. Concentration of 2,2′,4,4′-tetrahydroxy-benzophenone: 1,000 p.p.m. | | | | | |
| 0.5 | 92 | 97 | 84 | 80 | 79 |
| 0.05 | 94 | 89 | 88 | 87 | 85 |
| 2. Concentration of 2,2′,4,4′-tetrahydroxy-benzophenone: 500 p.p.m. | | | | | |
| 0.5 | 89 | 87 | 85 | 81 | 81 |
| 0.05 | 90 | 89 | 88 | 84 | 83 |
| 3. Concentration of 2,2′,4,4′-tetrahydroxy-benzophenone: 100 p.p.m. | | | | | |
| 0.5 | 95 | 90 | 77 | 62 | |
| 0.05 | 79 | 67 | 58 | | |
| 4. Concentration of 2,2′,4,4′-tetrahydroxy-benzophenone: 10 p.p.m. | | | | | |
| 0.5 | 86 | 85 | 78 | 71 | 70 |
| 0.05 | 43 | 40 | 34 | | |

EXPERIMENT V

The procedure of the preceding experiment was followed exactly, but the tetrahydroxy-benzophenone was replaced by 2-hydroxy-4-methoxy-benzophenone in the same concentrations; the water was replaced by a mixture of ethanol/water (60:40) due to the insolubility of this benzophenone in water. The results obtained are given in the following table.

| Concentration of EDDHA/Fe (percent) | Length of exposure (in hours) | | | | |
|---|---|---|---|---|---|
| | 40 | 60 | 80 | 100 | 120 |
| 1. Concentration of 2-hydroxy-4-methoxy-benzophenone: 1,000 p.p.m. | | | | | |
| 0.5 | 97 | 97 | 95 | 94 | 84 |
| 0.05 | 85 | 76 | 74 | 70 | 54 |
| 2. Concentration of 2-hydroxy-4-methoxy-benzophenone: 500 p.p.m. | | | | | |
| 0.5 | 97 | 95 | 94 | 88 | 83 |
| 0.05 | 91 | 87 | 81 | 75 | 73 |
| 3. Concentration of 2-hydroxy-4-methoxy-benzophenone: 100 p.p.m. | | | | | |
| 0.5 | 96 | 93 | 87 | 86 | 78 |
| 0.05 | 78 | 60 | 51 | 46 | |
| 4. Concentration of 2-hydroxy-4-methoxy-benzophenone: 10 p.p.m. | | | | | |
| 0.5 | 95 | 94 | 87 | 81 | 76 |
| 0.05 | 50 | | | | |

EXPERIMENT VI

The procedure of Experiment IV was followed, but this time 2,4-dihydroxy-benzophenone was used; the water was replaced by a mixture of ethanol/water (40:60). The results are given in the following table:

| Concentration of EDDHA/Fe (percent) | Length of exposure (in hours) | | | | |
|---|---|---|---|---|---|
| | 40 | 60 | 80 | 100 | 120 |
| 1. Concentration of 2,4-dihydroxy-benzophenone: 1,000 p.p.m. | | | | | |
| 0.5 | 97 | 96 | 94 | 83 | 83 |
| 0.05 | 90 | 89 | 87 | 82 | |
| 2. Concentration of 2,4-dihydroxy-benzophenone: 500 p.p.m. | | | | | |
| 0.5 | 95 | 94 | 91 | 85 | 83 |
| 0.05 | 87 | 84 | 79 | 70 | |
| 3. Concentration of 2,4-dihydroxy-benzophenone: 100 p.p.m. | | | | | |
| 0.5 | 94 | 89 | 87 | 80 | 77 |
| 0.05 | 70 | 61 | 56 | 46 | |
| 4. Concentration of 2,4-dihydroxy-benzophenone: 10 p.p.m. | | | | | |
| 0.5 | 91 | 89 | 76 | 76 | 74 |
| 0.05 | 43 | | | | |

EXPERIMENT VII

The procedure of Experiment IV is followed but the sodium salt of 2,2'-dihydroxy-4,4'-dimethoxy-5-sulphobenzophenone is used; the EDDHA/Fe chelate was used in an amount of 0.05%; the results are given in the following table:

| Concentration of stabilizer (p.p.m.) | Length of exposure (in hours) | | | | |
|---|---|---|---|---|---|
| | 40 | 60 | 80 | 100 | 120 |
| 1,000 | 83 | 74 | 65 | 52 | 45 |
| 500 | 73 | 66 | 53 | 40 | 30 |
| 100 | 56 | 38 | 14 | | |

The results of the last four experiments, compared with those of the first one, show the importance of the protective role played by the stabilizers according to the invention for compositions containing the ferric chelate of ethylene-diamino-N,N'-bis[α-(2-hydroxy-phenyl)-acetic acid], here called EDDHA/Fe.

EXPERIMENT VIII

The procedure of Experiment IV was followed but aqueous solutions of the chelate EDDHMA/Fe in concentrations of 0.05 and 0.2% were used; the stabilizer employed was the same, i.e. 2,2',4,4'-tetrahydroxy-benzophenone in amounts of 250 and 100 p.p.m. The results are given in the following table.

| Concentration of EDDHMA/Fe (percent) | Length of exposure (in hours) | | | |
|---|---|---|---|---|
| | 20 | 60 | 120 | 180 |
| 1. Concentration of 2,2',4,4'-tetrahydroxy-benzophenone: 250 p.p.m. | | | | |
| 0.05 | 94 | 82 | 60 | 34 |
| 0.02 | 88 | 64 | 37 | 7 |
| 2. Concentration of 2,2',4,4'-tetrahydroxy-benzophenone: 100 p.p.m. | | | | |
| 0.05 | 89 | 64 | 55 | 38 |
| 0.02 | 86 | 50 | 22 | 4 |

EXPERIMENT IX

The procedure of Experiment IV is followed using aqueous solutions of EDDHMA/Fe chelate in concentrations of 0.05 and 0.02% and, as stabilizer, 250 p.p.m. of a mixture of 2,2',4,4'-tetrahydroxy-benzophenone and 2,2'-dihydroxy-4,4'-dimethoxy-benzophenone sold under the trademark "UVINUL 490" by the American company General Aniline & Film Corporation, New York.

The results are given in the following table.

| Concentration of EDDHMA/Fe (percent) | Length of exposure (in hours) | | | |
|---|---|---|---|---|
| | 20 | 60 | 120 | 180 |
| 0.05 | 91 | 69 | 37 | 23 |
| 0.02 | 88 | 39 | 31 | 8 |

The results of the last two experiments, compared with those of the second one, show that the stabilizers according to the invention well protect the ferric chelate of ethylene-diamino-N,N'-bis[α-(2-hydroxy-5-methyl-phenyl)-acetic acid], here called EDDHMA/Fe, in the compositions containing it.

Several examples of stabilized compositions are given below to better illustrate the invention; these examples do not limit the scope of the invention in any way; in particular, the chelates EDDHA/Fe and EDDHMA/Fe cited may be replaced by other ferric complexes, especially by those given above.

Examples 1 to 12

Compositions for the treatment, by spraying the leaves, of market-gardens (especially cultivations of lettuce, beans, tomatoes, cucumbers and strawberry plants), of fruit trees (most especially orange, apple, pear and apricot trees) and ornamental plants; the values are given in percent by weight, the remainder being made up to 100 by the use of water as solvent. These compositions, of course, can also be formulated with less water in the form of concentrates to be diluted, or without water in the form of powders, granulates, tablets, or other products for dissolution.

| | 1 | 2 | 3 | 4 | 5 | 6 | 7 | 8 | 9 | 10 | 11 | 12 |
|---|---|---|---|---|---|---|---|---|---|---|---|---|
| Chelate EDDHA/Fe | 0.1 | | | 0.1 | | 0.1 | 0.1 | | 0.04 | 0.04 | | 0.06 | 0.06 |
| Chelate EDDHMA/Fe | | 0.1 | | 0.1 | | | | 0.1 | | | 0.06 | | |
| Chelate EDTA/Zn [a] | 0.1 | 0.1 | 0.1 | 0.1 | 0.1 | | | | 0.04 | 0.02 | 0.06 | 0.06 | 0.06 |
| Chelate EDTA/Mn | 0.1 | 0.1 | | 0.1 | 0.1 | | | | 0.04 | 0.02 | 0.05 | 0.06 | 0.06 |
| Chelate EDTA/Cu | | | | | | | | | 0.02 | 0.01 | 0.03 | 0.03 | 0.03 |
| Boric acid | | | | | | | | | | | 0.04 | 0.004 | 0.004 |
| Potassium nitrate | | | | | | | | | 0.03 | 0.02 | 0.05 | 0.05 | 0.05 |
| Urea | | | | | 0.05 | 0.05 | 0.05 | | | | | | |
| Stabilizer A [b] | 0.03 | 0.02 | | | 0.03 | 0.03 | 0.02 | | 0.01 | | 0.01 | 0.02 | |
| Stabilizer B [c] | | | 0.05 | | | | | | | 0.02 | | | 0.03 |
| Stabilizer C [d] | | | | 0.04 | | | | | | | | | |

[a] The abbreviation EDTA designates the disodium salt of ethylene-diamino-tetracetic acid.
[b] Stabilizer A: 2,2',4,4'-tetrahydroxy-benzophenone.
[c] Stabilizer B: sodium salt of 2,2'-dihydroxy-4,4'-dimethoxy-5-sulphobenzophenone.
[d] Stabilizer C: mixture of 2,2',4,4'-tetrahydroxy-benzophenone and 2,2'-dihydroxy-4,4'-dimethoxy-benzophenone sold under the trademark "UVINUL 490" by the company General Aniline & Film Corporation, already mentioned.

Examples 13 to 22

Compositions for the fertilization of plants and the preventive or remedial treatment of their iron deficiency chlorosis by watering the soil or any other medium containing the roots.

The values are given in percent by weight, the remainder being made up to 100 by the use of water as solvent. These compositions, of course, can also be formulated with less water in the form of concentrates to be diluted, or without water in the form of powders, granulates, tablets, or other products for dissolution.

|  | 13 | 14 | 15 | 16 | 17 | 18 | 19 | 20 | 21 | 22 |
|---|---|---|---|---|---|---|---|---|---|---|
| Chelate EDDHA/Fe | 0.05 | 0.05 | 0.05 | 0.05 | | | 0.1 | | 0.1 | |
| Chelate EDDHMA/Fe | | | | | 0.05 | 0.05 | | 0.1 | | 0.1 |
| Diammonium phosphate | 5.6 | 3.9 | 3.9 | 3.9 | 3.9 | 3.9 | 5.6 | 5.6 | 3.9 | 3.9 |
| Potassium nitrate | 8.6 | 9.2 | 9.2 | 9.2 | 9.2 | 9.2 | 8.6 | 8.6 | 9.2 | 9.2 |
| Ammonium nitrate | 3.5 | | | | | | 3.5 | 3.5 | | |
| Mixture of trace elements [a] | 0.3 | 0.2 | 0.2 | 0.2 | 0.2 | 0.2 | 0.3 | 0.3 | 0.2 | 0.2 |
| Stabilizer A | 0.02 | 0.02 | | | 0.01 | | 0.04 | 0.02 | 0.04 | 0.02 |
| Stabilizer B | | | 0.03 | | | | | | | |
| Stabilizer C | | | | 0.03 | | 0.02 | | | | |

[a] Such a mixture may be, for example, one of the two following:

| (1) | Percent | | (2) | Percent |
|---|---|---|---|---|
| Chelate EDTA/Mn | 47 | | Manganese sulphate | 8.5 |
| Chelate EDTA/Ni | 11 | | Nickel sulphate | 2.0 |
| Chelate EDTA/Zn | 17 | | Zinc sulphate | 3.0 |
| Chelate EDTA/Cu | 5 | | Copper sulphate | 1.0 |
| Sodium borate | 20 | | Boric acid | 20.0 |
|  |  | | EDTA (disodium salt) | 65.5 |

Examples 23 to 35

Compositions for the treatment, by spraying the leaves, of market-gardens, fruit trees or ornamental plants and employed as solutions or suspensions in water (values are given in percent by weight).

|  | 24 | 25 | 26 | 27 | 28 | 29 | 30 | 31 | 32 | 33 | 34 | 35 |
|---|---|---|---|---|---|---|---|---|---|---|---|---|
| Chelate EDDHA/Fe | 10 | 16 | | 40 | 25 | 24 | 30 | | 72 | | 50 | |
| Chelate EDDHMA/Fe | | | 15 | | | | | 30 | | 66 | | 25 |
| Stabilizer A | 6 | | | 12 | | 6 | | | 18 | 24 | 20 | |
| Stabilizer B | | 8 | | | 10 | | 10 | 15 | | | | 10 |
| Stabilizer C | | | 4 | | | | | | | | | |
| DDT [a] | 5 | | | | | | | | | | | |
| Dimetan [b] | 1 | | | | | | | | | | | |
| Carbaryl [c] | | 5 | 7 | 15 | | | | | | | | |
| Dinocap [d] | | | 3 | | | | | | | | | |
| Sulphur (very finely divided) | 20 | 16 | | | | | | | | | | |
| Zineb [e] | | 10 | | | | | | | | | | |
| Chloropropylate [f] | 6 | 5 | | | | | | | | | | |
| Lecithin [g] | | | | | 65 | | | | | | 30 | |
| n-Octadecylamine [h] | | | | | | 70 | | 55 | | | | |
| Sodium distearylsulphosuccinate [i] | | | | | | | 60 | | | 6 | | |
| Sodium dodecylbenzene-sulphonate [j] | | | | 30 | | | | | | | | |
| Sodium oxyligninsulphonate [k] | 5 | 4 | 4 | 3 | | | | | 4 | 4 | | |
| Polyethylene glycol mono-oleate [l] | 8 | 6 | 8 | | | | | | 6 | | | 65 |
| Fossil silica | 2 | | 5 | | | | | | | | | |
| Kaolin | 37 | 30 | 54 | | | | | | | | | |

[a] Abbreviation customarily used to designate the insecticidal substance 2,2-bis(4-chloro-phenyl)-1,1,1-trichloro-ethane, sold by the applicant.
[b] Common name designating the systemic insecticide 5,5-dimethyl-3-oxo-1-cyclohexenyl N,N-diemthylcarbamate sold by the applicant.
[c] Common name designating α-naphthyl N-methylcarbamate, insecticide sold by the American company Union Carbide Chemicals Co.
[d] Common name designating 2,4-dinitro-6-(2-octyl)-phenyl crotonate, fungicide and acaricide sold by the American company Rohm & Haas Co.
[e] Common name designating zinc 1,2-ethylene-bisdithiocarbamate, fungicide sold by the American company Rohm & Haas Co.
[f] Designation used for 4,4'-dichloro-isopropylbenzilate, acaricide sold by the applicant.
[g] Natural amphoteric surfactant also known under the name of phosphatidylcholine, sold by the American company Central Soya under the trademark "Centrophill IP."
[h] Cationic surfactant sold by the American company Armour & Co. under the trademark "Armeen 18 D."
[i] Anionic surfactant sold by the American Company American Cyanamid Co.
[j] Anionic surfactant sold by the American company Atlantic Refining Co. under the trademark "Ultrawet K."
[k] Anionic surfactant sold by the Norwegian company Borregaard under the trademark "Vanisperse CB."
[l] Non-ionic surfactant sold by the American company Armour & Co. under the trademark "PEG-1000-MO."

What is claimed is:

1. A stabilized iron-chelate composition, comprising an iron chelate obtained by complexing with iron, and ethyiene-diamine diphenacetic acid or a salt thereof as defined below in a ratio of acid molecule-to-iron atom of about 1:1, which chelate is of the formula:

$X_1$ to $X_8$ are identical or different and are selected from a hydrogen atom, an alkyl radical having 1 to 12 carbon atoms, a hydroxyl, a nitro, a cyano group, an alkoxy group containing 1 to 8 carbon atoms, a chlorine atom, a bromine atom, an iodine atom, —COOM, —SO$_3$M, and

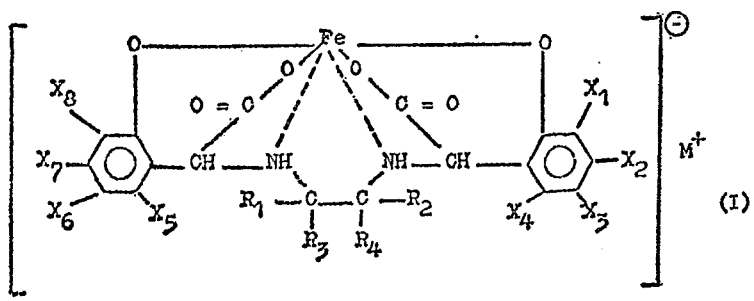

wherein $R_1$, $R_2$, $R_3$ and $R_4$ are identical or different and each is selected from the group consisting of hydrogen, alkyl of from 1 to 5 carbon atoms, or hydroxyalkyl of from 1 to 3 carbon atoms;

wherein $Y_1$ is selected from the group consisting of hydrogen, alkyl of from 1 to 4 carbon atoms, hydroxyalkyl of from 2 to 4 carbon atoms, alkanoyl of 2 to 8 carbon atoms, and alkenoyl of 3 to 8 carbon atoms, and $Y_2$ is selected from the group consisting of hydrogen, alkyl of from 1 to 4 carbon atoms or hydroxyalkyl of from 2 to 4 carbon atoms; and each of M and M⊕ is identical or different and is selected from the group consisting of a hydrogen ion, an alkali-metal cation, and ammonium, and, in an amount of 0.02 to 10% by weight calculated on the complex I, to stabilize said chelate against deterioration due to the influence of water, light or climate, a hydroxybenzophenone of the formula:

(II)

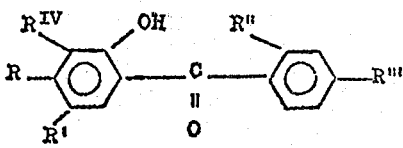

wherein:
R is selected from the group consisting of hydrogen, hydroxy and alkyl of from 1 to 8 carbon atoms,
R' is selected from the group consisting of hydrogen, chlorine, alkyl of from 1 to 5 carbon atoms and —$SO_3M$,
R" is selected from the group consisting of hyrogen, chlorine, hydroxy, alkyl of from 1 to 5 carbon atoms, alkoxy of from 1 to 8 carbon atoms and —COOM,
R'" is selected from the group consisting of hydrogen, chlorine, hydroxy, alkyl of from 1 to 5 carbon atoms and alkoxy of from 1 to 8 carbon atoms,
$R^{IV}$ is selected from the group consisting of hydrogen and alkyl of from 1 to 5 carbon atoms, and
M has one of the meanings given in conjunction with Formula I.

2. A composition as defined in claim 1, wherein said hydroxy-benzophenone is present in an amount of from 0.2 to 2% by weight calculated on the iron chelate.

3. A composition as defined in claim 1 wherein the iron chelate is present in an amount of from 0.01 to about 80% by weight when said composition is solid and in an amount of from 0.01 to about 20% by weight when said composition is liquid.

4. A composition as defined in claim 1 wherein $X_1$ to $X_8$ are such that the two aromatic moieties of the molecule are symmetric.

5. A composition as defined in claim 1 wherein each of $X_1$ to $X_8$ is selected from the group consisting of hydrogen and methyl, and wherein each of $R_1$, $R_2$, $R_3$ and $R_4$ is selected from the group consisting of hydrogen, methyl and ethyl, or wherein $R_3$ and $R_4$ together are selected from a tetramethylene group, $R_1$ and $R_2$ being hydrogen atoms.

6. A composition as defined in claim 5 wherein said iron chelate is a sodium, potassium, ammonium, diethylamine, diethanolamine, or morpholine salt of 1,2-bis(2-hydroxy-α-carboxybenzyl)-ethane.

7. A composition as defined in claim 5 wherein said iron chelate is a sodium, potassium, ammonium, diethylamine, diethylanolamine, or morpholine salt of 1,2-bis(2-hydroxy-5-methyl-α-carboxybenzylamino)-ethane.

8. A composition as defined in claim 5 wherein the iron chelate is a sodium, potassium, ammonium, diethylamine, diethanolamine or morpholine salt of 1,2-bis-(2-hydroxy-α-carboxybenzylamino)-cyclohexane.

9. A composition according to claim 1, which further contains a lower alkanol.

References Cited

UNITED STATES PATENTS

| | | | |
|---|---|---|---|
| 2,921,907 | 1/1960 | Kleyn | 252—107 |
| 2,876,210 | 3/1959 | Wynn et al. | 260—45.95 |
| 2,974,053 | 3/1961 | Suchow | 106—187 |
| 2,976,259 | 3/1961 | Hardy et al. | 260—45.95 |

OTHER REFERENCES

Noller, Chemistry of Organic Compounds, W. B. Saunders Co., Philadelphia, 3rd ed., 1966, p. 587.
Brown, Chem. Abstracts, 54 (1960) column 17748.

JAMES E. POER, Primary Examiner
A. P. DEMERS, Assistant Examiner

U.S. Cl. X.R.
71—3, 27, 67, 97; 260—242, 268 R, 270 R, 326.8, 429 J

UNITED STATES PATENT OFFICE
CERTIFICATE OF CORRECTION

Patent No. 3,711,525        Dated January 16, 1973

Inventor(s)  Claude Hennart

It is certified that error appears in the above-identified patent and that said Letters Patent are hereby corrected as shown below:

Column 1, line 2, under the title, after ", France" please insert the following:
  -- , assignor to Ciba-Geigy AG, Basel, Switzerland --;

Column 1, between lines 3 and 4, under the title, please insert:
  -- Claims priority, application France, November 28, 1969, Serial No. 69/41124 --.

Signed and sealed this 12th day of February 1974.

(SEAL)
Attest:

EDWARD M. FLETCHER, JR.
Attesting Officer

C. MARSHALL DANN
Commissioner of Patents